(12) United States Patent
Malackowski et al.

(10) Patent No.: US 8,831,985 B2
(45) Date of Patent: Sep. 9, 2014

(54) FINANCIAL INSTRUMENT BASED ON CONTENT AND METHODS FOR VALUATION

(75) Inventors: James E. Malackowski, Chicago, IL (US); Cameron Gray, Chicago, IL (US); Keith M. Cardoza, Chicago, IL (US); Jonathan A. Barney, Chicago, IL (US); Jason L. Gardner, Austin, TX (US); Stephen C. Yelderman, Chicago, IL (US)

(73) Assignee: Ocean Tomo LLC, Chicago, IL (US)

( * ) Notice: Subject to any disclaimer, the term of this patent is extended or adjusted under 35 U.S.C. 154(b) by 815 days.

(21) Appl. No.: 12/449,268

(22) PCT Filed: Jan. 31, 2008

(86) PCT No.: PCT/US2008/001341
§ 371 (c)(1), (2), (4) Date: Nov. 10, 2009

(87) PCT Pub. No.: WO2008/094680
PCT Pub. Date: Aug. 7, 2008

(65) Prior Publication Data
US 2010/0100501 A1 Apr. 22, 2010

Related U.S. Application Data

(60) Provisional application No. 60/887,575, filed on Jan. 31, 2007.

(51) Int. Cl.
*G06Q 40/00* (2012.01)

(52) U.S. Cl.
USPC .................................................. 705/35

(58) Field of Classification Search
CPC ....... G06Q 40/00; G06Q 50/00; G06Q 20/22; G06Q 20/29
USPC .......................... 705/1–50; 702/181; 707/101
See application file for complete search history.

(56) References Cited

U.S. PATENT DOCUMENTS

| | | | |
|---|---|---|---|
| 6,766,307 B1 * | 7/2004 | Israel et al. | 705/80 |
| 6,792,128 B1 * | 9/2004 | Nguyen | 382/100 |
| 8,078,545 B1 * | 12/2011 | Zilka et al. | 705/310 |
| 2003/0101125 A1 * | 5/2003 | McGill et al. | 705/37 |
| 2004/0010393 A1 * | 1/2004 | Barney | 702/181 |
| 2007/0073748 A1 * | 3/2007 | Barney | 707/101 |

OTHER PUBLICATIONS

Guido Scheffer et al., Methods for Patent Valuation, Jul. 1, 2005, KPMG, 1-11.*

* cited by examiner

*Primary Examiner* — Marissa Liu
(74) *Attorney, Agent, or Firm* — Valauskas Corder LLC

(57) ABSTRACT

The present invention is a system and methods by which an investment vehicle can be established that is directed to one or a very limited specific form of content. More specifically, the system and methods of the present invention creates a financial instrument directed to specific content—such as a specific technology or specific artistic or literary work—that may be issued, thereby providing investors with the opportunity to invest in the specific content or aspect of that specific content.

12 Claims, 5 Drawing Sheets

FINANCIAL INSTRUMENT BASED ON CONTENT AND METHODS FOR VALUATION

This application claims the benefit of U.S. Provisional Application No. 60/887,575 filed Jan. 31, 2007.

FIELD OF THE INVENTION

The present invention relates generally to financial instruments. More particularly, the present invention relates to a financial instrument based on a specific technology or other form of content that is suitable for trading on an exchange network.

BACKGROUND OF THE INVENTION

More and more of the ever growing human enterprise is devoted to scientific engineering, and artistic inquiry, exploration, and experimentation. These efforts result in various forms of what will be termed for purposes of this application, "content". Content is created, developed, or formulated in a variety of contexts and by individuals or business entities, including non-profit and for-profit institutions and companies. Scientific or engineering research and development efforts typically produce technology-based content. Prototypes, machines, systems, processes, data, software, and inventions represent just some of that which results from these efforts. Artistic or literary efforts produce content that is manifested in a wide variety of forms such as works of fiction and non-fiction, movie and television treatments, screenplays, visual displays, software, choreography, and architectural works.

Governments have sought to encourage these many efforts by putting in place laws that extend legal protection to certain aspects of the content. Copyright law protects certain artistic and literary content automatically upon its expression in a tangible form. Trade secret law protects information (such as that which could be developed during the course of any of the above forms of inquiry) that has value and is not publicly disclosed. Patent law allows patents to issue for various forms of inventions that meet certain statutory guidelines.

The specific content that results from these many various creative and inventive efforts has widely ranging potential or actual value and thereby presents many, widely ranging investment opportunities. Only limited mechanisms, however, are available by which investors can invest in this wide range of opportunities. The mechanisms by which investors can make highly focused investments in a very specific area of technology or other type of content is even more limited. An "investor", for purposes of this application, may be any person or entity such as for-profit or non-profit, pubic or private company. The very specific content that is or may be of interest to an investor and to which an investment opportunity shall be directed shall be termed, for purposes of this application, "target content".

One traditional option available to an investor who wishes to invest in certain content is to buy the publicly traded shares of a company that is known to be developing that certain content. The content may be in, for example, a specific area of technology. However, most publicly traded companies do not develop a single form of content, such as one specific form of technology. The research and development efforts of a publicly traded company are typically directed to many different types of technologies, in part to spread the risk of the company over many areas. As a result, by buying shares of such a company, an investor is in reality investing in the many different specific forms of content, not just the target content, that has been or is being developed or created at the company. The price of the shares therefore reflects the potential and actual value of all content—for example, a target technology and one or more other technologies—but also all of the other efforts and overhead of the company. An investor currently cannot isolate an investment to a single target technology from all of the other technologies of one or more companies.

Mutual funds or other collective investment opportunities are identified at times as having a certain technology focus in the stocks or securities which are offered. For example, some mutual fund companies offer "select" portfolios such as in energy, or medical delivery, or medical equipment and systems, or software, or wireless technologies. However, such portfolios again only offer investment opportunities in the publicly-traded shares of companies, some, but not all of the content which they have developed is in the portfolio area. Again, such funds do not permit highly focused investments in a very specific technology or other form of content.

Certain companies—typically privately held companies, such as start-up companies—focus on the development of one, or more very limited range of content, such as that which is related to a specific technology. Only in certain circumstances do such companies permit third party investments. Furthermore, investing in a privately held or a start-up company is often considered to be a high risk gamble. Such investments are renowned for poor investment liquidity, that is, lacking the ability for the investment to be easily converted through an act of buying or selling with minimum loss of value. Typically, because of the high risk involved, the conventional instruments that are available to investors to invest in start-up companies are designed to have a certain degree of technology diversity, and do not facilitate investments in highly focused content areas. Such instruments are of limited appeal to an investor with an interest in investing in a target technology.

Accordingly, none of the options available to an investor provide investments that are specific to content or offer investor diversity within a highly specific content area. Therefore, what is needed is a system and methods that permits investors to make highly focused investments in content of a very specific nature. The present invention satisfies the demand.

SUMMARY OF THE INVENTION

The present invention is a system and methods by which an investment vehicle can be established that is directed to one or a very limited specific form of content. More specifically, the system and methods of the present invention creates a financial instrument directed to specific content—such as a specific technology or specific artistic or literary work—that may be issued, thereby providing investors with the opportunity to invest in the specific content or aspect of that specific content.

The system and methods of the present invention permits the content to which the financial instrument is directed to be defined and a target within the content to be determined. The content and target content can be specified by the issuer of the financial instrument, who either has an interest or does not have an interest in the content, or target content. An issuer who has an interest in the financial instrument may be an investor or owner of, for example, a group of patents covering the target content area.

The issuer may be further defined as an investor or third party as well as those individuals or entities that post the financial instrument and do not necessarily incur liability for that which occurs to the financial instrument. The term issuer may also include exchanges or marketplaces. An investor is anyone who buys the financial instrument (sometimes based on specialized knowledge) in hopes of potential profitable returns, such as a private individual, a business, or a legal entity, for example, a trust. A third party is anyone who offers the financial instrument in the hopes of generating revenue, for example, to fund further exploration in the content. A third party may include a creator or developer of the content, a speculator, a hedger, or an owner of the content. As an example, an owner of content may be an inventor or assignee of a patent. A speculator is anyone who is engaged in commercial or financial speculation, such as an investor who has a strong view about future market conditions and wants investments that will generate substantial returns should those conditions materialize. A hedger, in contrast, has concerns about the impact of adverse market conditions on other existing investments or further business operations.

At the time the financial instrument is created, the target content to which the financial instrument is directed may be largely unknown and highly speculative. For example, the target content may be the result of the creative efforts of a single individual, or the creative efforts of a single university laboratory or software engineering group, or the one or more patent applications that may be filed for the work of one inventor, or those that are filed for an entire department at a specific university. The target content may also be one or more patents, copyright registrations, trademark registrations, or other grants issued for intellectual property. The intellectual property may be that which is already being commercialized and therefore generating some revenue. Target content, as a result, may be susceptible to performance at a point in time in the future. Once it is believed or it is established that the target content may or does have a value that is more readily susceptible to measurement, a performance metric, for example, can be used to place a value on the content.

The present invention also includes an electronic trading system over which investors can, preferably in real time, commit to buy and trade offerings of the financial instruments based on content. The system preferably operates over either a private electronic communications network or over a public communications network such as the Internet, or both. Investors, who preferably enter into appropriate contracts that define the terms of the financial instrument, can through the system, buy the instrument.

According to the present invention, the content is the general subject matter of the financial instrument. Content can be the known results or the potential results in an area, or from certain scientific, artistic or literary efforts. Content generally includes information, experiences, and technology as well as tangible and intangible property. Content can be manifested in many forms and in many different kinds of contexts, including electronic content presented via computers and mobile devices, printed materials such as books and newspapers, television, movies and radio as well as live performances of drama and music such as those presented in a theatre or performances of speeches or interactive experiences such as games or sporting events. It is that area in which the issuer wishes to establish the financial instrument. For example, it can be an area of technology, (e.g., nanotechnology, hydrogen fuel cells, recombinant technology, etc.), the actual or potential source of such technology (e.g., a specific university or group of universities, a specific laboratory or group of laboratories, etc.), inaction with respect to the content in a technology area (e.g., farmer does not cultivate land in soybeans), a mix of action or inaction with respect to the content in a technology area (e.g., a university laboratory focuses its research efforts on a specific technology and not some other technology) or a specific type of artistic or literary work.

For purposes of this application, intangible property is a collection of rights that can be owned but which has no physical substance. As with forms of tangible property, intangible property content can be defined as all or some limited portions of the property. By definition, intangible properties cannot be seen, touched or physically measured. For purposes of this application, the term "intangible property" includes intellectual property—patents, copyrights, trademark rights, trade secrets, the rights of publicity—and other non-tangible properties and interests, such as those that arise of documents describing new technologies including written disclosures, algorithms, laboratory notebooks, (including descriptions, manuscripts, and treatments from which novels, screenplays, and movies may be produced), exploitation rights and exploration rights (including prospector's claims, mineral rights, water rights, and air rights), fishing rights, taxi medallions, and naming rights. Intangible property may also include domain names, naming rights, customer lists, knowledge, know-how, research and development, collaboration activities, leverage activities, relationships, and systems such as taxi medallion systems.

Once the content of the financial instrument is defined, a target within the defined content is determined. Again, target content may be known or may be nothing more than what may occur in the future. Target content can be, what is termed herein as "actual target content," such as one or a group of related patents, or, what is termed here as "potential content," such as the possible filing of a patent application or the possible grant of a patent or patents. There are a largely very wide range of forms of target content within any given defined content. Examples of target content with the defined content include: nanotechnology copyrights within technology; patents directed to devices having flexible elements within nanotechnology; subject matter directed to a target audience within copyrightable subject matter; laboratory results within an experimental test; an author of published materials; a publisher of books; patents within hybrid electric vehicles, among others.

Target content can be determined simply by specificity of the issuer of the financial instrument, and may be susceptible to performance in the future. Besides the issuer of the financial instrument determining the target content, target content can be determined also by a variety of approaches wherein performance has been executed. In one embodiment, the target content is determined by utilizing a classification system, for example, the class schedule, subclass schedule, or technology center identifiers of the United States Patent and Trademark Office ("USPTO"), or Standard Industrial Classification ("SIC") based product field codes.

The present invention provides another approach for determining target content through the use of an analytical method. An analytical method advantageously provides flexibility and may be more appropriate for emerging content. For example, if the content is apparel, then the target content may include all emerging patents within apparel content. The target content, or all emerging apparel patents, may be determined based on both the USPTO classification system and citation relationships noted in the specific patents with respect to other patents. Such an approach could have the advantage of more accurate placement of patents within the target content.

Yet another approach for determining target content uses relevance scores. In one embodiment, a relevance score is used with respect to the relevance of a patent to seed patents. Seed patents are the group of patents known to belong to certain target content. If an issued patent, or patent publication, has a relevance score that meets or exceeds the seed patents, then it may be added to the seed patents of the target content. Thus, the seed patents increase in number as the target content expands, but is also contemplated that the seed patents can be fixed over time.

The relevance score of a patent may be calculated based on the average of more than one relevance score of the patent to the seed patents. Relevance between two patents can be quantified based on a variety of factors to produce a relevance score such as those disclosed in U.S. patent application Ser. No. 11/236,965, entitled "Method and System for Probabilistically Quantifying and Visualizing Relevance Between Two or More Citationally or Contextually Related Data Objects" by Jonathan Barney, the disclosure of which is hereby incorporated by reference in its entirety. Also incorporated herein by reference are the relevance scores between patents available from PatentRatings LLC of Irvine, Calif.

Yet another approach for determining target content uses a relevance threshold. In one embodiment, target content has an established relevance threshold based on seed patents. As the target content develops, additional patents having a relevance score that is above the relevance threshold of the seed patents is added to the seed patents of the target content.

Yet another approach for determining target content uses a common identifier. For example, the target content may be all of the patents identifying the same inventor or assignee.

Valuation is the method for assessing whether an investment is worth its price. The value of the financial instrument may change over time. A value placed on the financial instrument may be established by the issuer, based in part by payout conditions. Payout conditions include the terms of the possible payout on the delivery date. The delivery date is the day on which the instrument expires or a payout is received by an investor.

A value placed on the financial instrument may also be a rationally based method such as using performance metrics. The value may be determined by performance metrics on the date the instrument issues or the date an investor establishes a position in the financial instrument, both which maybe different from the value determined at the date the instrument is delivered.

The performance metrics value the financial instrument based on measurable target content. Therefore, in embodiments where the target content is susceptible to performance, performance must actually be executed before the financial instrument can be valued using performance metrics. Target content can be determined simply by specificity of the issuer of the financial instrument, and thereby be susceptible to performance. Besides the issuer of the financial instrument determining the target content, target content can be determined by a variety of approaches wherein performance has been executed.

Performance metrics evaluate the state of the target content to place a value on the financial instrument that is offered and exchanged through the exchange network. In embodiments where a master financial instrument based on content is tied to a plurality of concurrently trading financial instruments based on content, the master financial instrument reflects a value of each instrument of the plurality. Performance metrics may encapsulate the progress of target content worldwide. Various performance metrics can be used based on human analysis, computer models, or a combination of both. According to the present invention, performance metrics include closed-source analytics, open-source analytics, or market-based analytics.

Closed-source analytics include an analytical approach for estimating the value of the target content. Closed-source analytics typically include private analyses such that the exact methods and implementations, for example coefficients and/or source code, used to calculate the performance metric of the financial instrument may not be publicly available, or may be protected by trade secret, patents, copyright or other forms of intellectual property protection. Closed-source analytics typically issue the performance metrics on a regular basis, such as individually or cumulatively, by a recognized performance metric publisher.

Examples of closed-source analytics include performance metrics such as the Maintenance Value (MV) of a patent, available from PatentRatings, LLC of Irvine, Calif., incorporated herein by reference; performance metrics disclosed in U.S. patent application Ser. No. 10/397,053, entitled "Method and System for Valuing Intangible Assets" by Jonathan Barney, the disclosure of which is hereby incorporated by reference in its entirety; and performance metrics based on patent value such as that which used to be offered by "The Patent Board" of Chicago, Ill.; "1790 Analytics LLC" of Mount Laurel, N.J.; and "IPscore" from the European Patent Office.

Open-source analytics include public analyses for estimating the value of the target content, such as performance metrics based on publicly available information. Individual or cumulative performance metrics of content may be issued on a regular basis for consistency. It should be noted that any closed-source analytics could be standardized and opened for public use.

Examples of open-source analytics include performance metrics such as measuring: patent registration data in the United States and other national, regional or international government office; all of the rights arising out of a patent grant, or all of the rights associated with a copyright registration or a trademark registration; a group of rights less than all of the rights arising, for example, from a patent grant or copyright or trademark registration; an exclusive license to practice one or more of the statutory or judicial-based rights that a patent, copyright, or trademark provides; patent value; patent maintenance value; and sales such as sales of films, movies, books, or songs.

Market-based analytics include market for estimating the value of the target content, such as performance metrics based on trading data. For example, in embodiments where the financial instrument operates as a futures contract on a market-traded underlying asset, the performance metric may be based on the trading data resultant from market activity for the underlying asset. Additionally, if shares of (or licenses to) individual patents are publicly traded, the performance metric could be based on the market-determined value of the patents of a particular target content. Another approach is to publicly trade groups of patents or shares of licensing revenue from a group of patents, and use a performance metric based on the values of the groups of patents in target content.

Data can be produced from the evaluation of the financial instrument from the performance metrics. Data can also be produced from the trading activity of the financial instrument. This data can be produced consistently such as daily, weekly, or monthly. The data can further be stored in a database for reference or analysis, for example, to formulate trading strategies or to view the trading patterns of a particular financial instrument either currently or historically. It is further contemplated that this financial instrument data may be used to further assess and value the instrument created, issued, and offered under the system according to the present invention.

After the financial instrument is created and issued, an investor establishes a position taking into consideration risk. Risk denotes a potential negative impact to value that may arise from some current or future event. For example, investment risk is the probability that an investments actual return will be different than expected. This includes the possibility of losing some or all of the original investment. Depending on the position established, the type of investment risk will vary.

Positions established by the investor include the trading events that occur to the financial instrument. Trading events include: buy, sell, buy to open, buy to close, sell to open, and sell to close. Trading events are generally used to distinguish between establishing versus closing a position.

A long position can mean that the investor of the financial instrument owns the financial instrument and will profit if the price of the financial instrument goes up. Similarly, a long position in a futures contract or similar derivative means investor of the financial instrument will profit if the underlying asset increases in value.

A short position means the investor of the financial instrument leverages the financial instrument. Similarly, a short position in a futures contract or similar derivative means the investor of the financial instrument has the obligation to buy the future at a later date.

Buy is to exchange, trade or purchase for money or its equivalent. Sell is to exchange or deliver for money or its equivalent. "Buy to close" closes a short position. "Sell to open" opens, or establishes, a new short position. "Buy to open" opens, or establishes, a new long position whereas "sell to close" closes a long position.

On the delivery date, the instrument provides a payout based on the payout conditions. The payout can be a gain, loss, or neither with respect to the investor's initial buy. The payout can be monetary or non-monetary. Monetary payouts include revenue from a license, for example. Non-monetary payouts include one or more property rights, a license, or abandonment of a property right, for example. Payouts can also be structured such that they are treated as a charitable deduction, gift or inheritance, or receive other favorable taxing treatment.

The payout may also be correlated to the performance metric used to determine the state of the target content. The payout could also be derived as a percentage of the revenue received from a licensing or sale of the target content, such as intellectual property. In one embodiment, the financial instrument based on content operates as a contract to provide a cash amount on an expiration day.

The issuer of the financial instrument may be responsible for the payout, for example, one or more patent assignees of the target content, or from a speculator without a direct ownership interest in the financial instrument.

It is also contemplated that the payout may be capped at a maximum cash amount. Examples of payout structures include binary, linear, capped linear, call and put, among others. With a binary payout structure, the financial instrument specifies a strike price, or the price where the contract requires delivery of the payout; the investor of the financial instrument receives a predetermined fixed payout if and only if the performance metric is above the strike price on the expiration day.

With a linear payout structure, the investor of the financial instrument receives a payout that is linearly correlated to the performance metric on the expiration day. With a capped linear payout structure, the content financial instrument specifies a cap; the investor of the content financial instrument receives a payout that is linearly correlated to the performance metric on the expiration day, up to the maximum cash amount. With a call payout structure, the content financial instrument specifies a strike price; the investor of the content financial instrument receives a payout that is linearly correlated to the performance metric, if and only if the performance metric is above the strike price on the expiration day. With a put payout structure, the content financial instrument specifies a strike price; the investor of the financial instrument receives a payout that is linearly correlated to the performance metric, if and only if the performance metric is below the strike price on the expiration day.

Other payout structures are also contemplated such as those resultant from the various combinations of the exemplary payout structures included above.

The financial instrument according to the present invention may be a cash instrument or a derivative instrument, although any form of medium is contemplated. Securities may be broadly categorized into debt securities, such as banknotes, bonds and debentures, and equity securities such as common stocks. Derivatives may generally take the form of contracts such as futures, forwards, options, and swaps.

The financial instrument could be designed to trade on one or more public exchanges or marketplaces such as a public futures exchange. According to the present invention, financial instruments could be traded as over-the-counter instruments, as securities subject to the Securities Exchange Commission ("SEC"), as futures subject to the Commodity Futures Trading Commission ("CFTC"), as another instrument, such as a bond, registered with another regulatory agency, or as traded instruments available only to qualified investors, such as through SEC notice filing practice. The financial instrument may also be exempted from regulations such as those that a government or other regulatory body imposes.

Furthermore, more complex financial instruments may be created based on a combination of two or more financial instruments based on content. Complex financial instruments may include a master financial instrument based on content tied to a plurality of concurrently trading financial instruments based on content. Complex financial instruments include, for example, index or cash-flow based fixed income instruments, equity financial instruments, asset-backed instruments, index-linked instruments, index swap instruments, and total return swap instruments.

A financial instrument based on content could be implemented as a tradable security interest in the current or future status of intellectual properties of a particular entity, where the intellectual properties are directed to content such as technology, and more specifically target content such as electric car technology.

As an example, the financial instrument may be issued by one or more patent owners. A company developing electric car technology (Company A) could sell a financial instrument based on its electric car intellectual property such as patents, applications, or even future applications. The payout of the financial instrument could be derived as a percentage of the eventual revenue received from the licensing or sale of intellectual property in that target technology by Company A. The proceeds of the financial instrument sale could be used to support Company A's research and development activities, thereby increasing the likelihood of a breakthrough and giving investors more direct exposure to the financial benefits of that breakthrough.

As another example, competing company (Company B) could also buy Company A's financial instrument to hedge against the risk that Company A's research could prove more successful than its own. For some companies, buying of a financial instrument may be a cost-effective alternative to undertaking research in an area outside the company's area of expertise, freeing up resources to pursue the company's specialty more aggressively.

An object of the present invention is to provide a new financial instrument based on content.

An object of the present invention is to facilitate investing in content.

Another object of the present invention is to facilitate investing in actual content.

Yet another object of the present invention is to facilitate investing in potential content.

Another object of the present invention is to provide a new instrument for financing innovation and funding important research.

Yet another object of the present invention is to provide an investment that can be used in pension vehicles.

Another object of the present invention is to encourage innovation.

Yet another object of the present invention is to better facilitate management of the risk involved with taking ambitious approaches towards technological challenges.

An added object of the present invention is to permit an investor to buy or sell financial instruments based on content, thereby leveraging specialized financial knowledge.

Another object of the present invention is to hedge the economic value of content.

Yet another object of the present invention is to provide new hedging strategies against traditional equities and commodities positions, for example, to hedge against the risk of competing content and lower the cost of capital.

Another object of the present invention provides a financial instrument designed to facilitate convenient trading with low transaction cost.

Another object of the present invention is to provide an objective assessment of the cumulative value of target content.

Another object of the present invention is to speculate on the future value of content.

Yet another object of the present invention is to enable the efficient investment in a long term prospect of target content.

Yet another object of the present invention is to permit investment in content according to performance metrics that are fair, realistic and auditable.

An added object is to produce commercially useful valuations of financial instruments based on content.

Another object of the present invention is to allow an investor to create a portfolio pertaining to target content through a combination of financial instrument long and short positions. For example, an investor may directly invest in target content, such as oil exploration technology, and hedge his or her exposure to the success of that content through a short position, while investing in other target content, such as alternate fuels technology, through a long position.

Further aspects of the invention will become apparent from consideration of the drawings and the ensuing description of preferred embodiments of the invention. The embodiments described below are in specific reference to content, target content and valuation, although a person skilled in the art will realize that other types of content, target content and performance metrics, for example, those directed to trademarks or copyrightable subject matter or other intangible property rights are possible and that the details of the invention can be modified in a number of respects, all without departing from the inventive concept. Thus, the following drawings and description are to be regarded as illustrative in nature and not restrictive.

DETAILED DESCRIPTION OF EMBODIMENTS OF THE INVENTION

The embodiments described below are in specific reference to content, target content, and valuation, although a person skilled in the art will realize that other types of content, target content and performance metrics, for example, those directed to trademarks or copyrightable subject matter or other intangible property rights are possible and that the details of the invention can be modified in a number of respects, all without departing from the inventive concept.

Figure 1A:
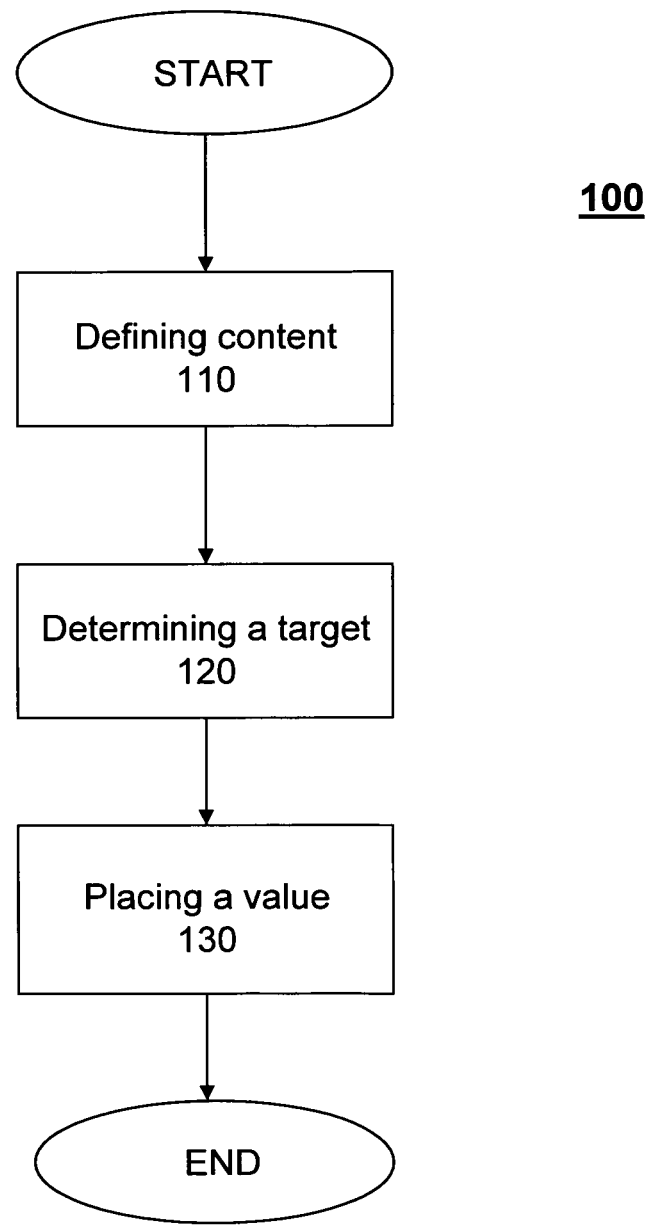
FIG. 1A is a flow chart of one embodiment of a method for creating a financial instrument based on content according to the present invention.

The present invention is a system and methods by which a new financial instrument based on content may be created and issued. FIG. 1A is a flow chart of one embodiment of a method 100 for creating a financial instrument based on content according to the present invention. The content to which the financial instrument is directed is defined at step 110. Content is the general subject matter of the financial instrument. Content can be the known results or the potential results in an area, or from certain scientific, artistic or literary efforts. Content generally includes information, experiences, and technology as well as tangible and intangible property. Content can be manifested in many forms and in many different kinds of contexts, including electronic content presented via computers and mobile devices, printed materials such as books and newspapers, television, movies and radio as well as live performances of drama and music such as those presented in a theatre or performances of speeches or interactive experiences such as games or sporting events. Content is that area in which the issuer wishes to establish the financial instrument. For example, it can be an area of technology, (e.g., nanotechnology, hydrogen fuel cells, recombinant technology, etc.) or the actual or potential source of such technology (e.g., a specific university or group of universities, a specific laboratory or group of laboratories, etc.), or a specific type of artistic or literary work.

To permit investments to be made with respect to a very specific area or aspect of the content, a target is determined within the content at step 120. Again, target content can advantageously be that which is known or may be that which may occur in the future. For example, the target content may be the patent applications or the patents that may be filed or may issue for a certain widely acknowledged inventive university investigator. Target content, accordingly, can be, what is termed herein as "actual target content," such as a group of related patents, or, what is termed here as "potential content," such as the possible filing of a patent application or the possible grant of a patent or patents. There are many forms of target content within a given defined content. Besides the issuer of the financial instrument determining the target content, target content can be determined also by a variety of approaches wherein some performance has been identified, for example, through the use of a classification system, an analytical method, relevance score, a relevance threshold, or a common identifier.

A value is placed on the target content at step 130. Valuation is the method for assessing whether an investment is worth its price. The issuer may place a value on the financial instrument that the issuer deems is appropriate. Alternatively, a possibly less subjective method can be used such as using performance metrics. The value of the financial instrument may, depending on the specific nature of the instrument, change over time. The value may be determined at the date an investor invests or establishes a position in the financial instrument, which maybe different than the value determined at the date the instrument is delivered. The delivery date is the day on which the instrument expires or a payout is received by an investor.

The performance metrics value the financial instrument based on measurable target content. Therefore, in embodiments where the target content is susceptible to performance, performance must actually be identifiable before the financial instrument can be valued using performance metrics. Target content can be determined simply by specificity of the issuer of the financial instrument, and thereby be susceptible to performance. Besides the issuer of the financial instrument determining the target content, target content can be determined by a variety of approaches wherein performance has been executed, such as closed-source analytics, open-source analytics, or market-based metrics.

Figure 1B:
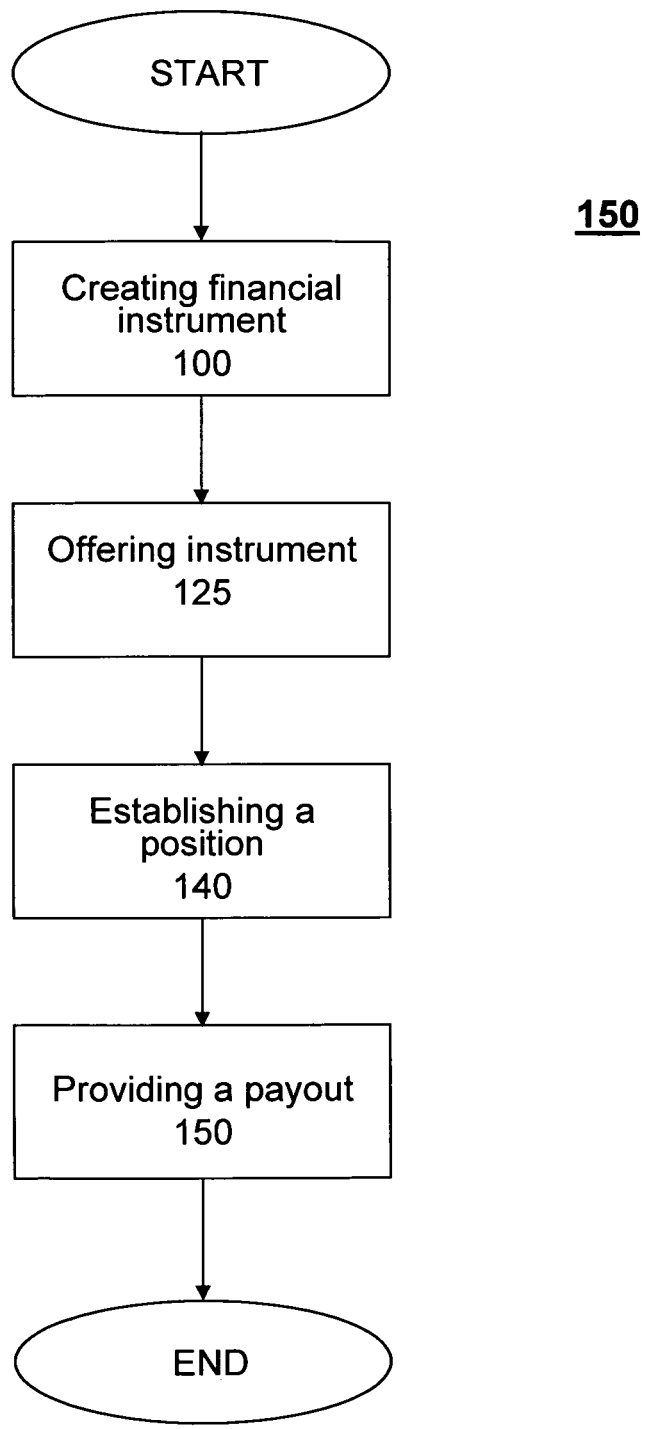
FIG. 1B is a flow chart of one embodiment of a method by which a financial instrument based on content according to the present invention may be traded.

FIG. 1B is a flow chart of one embodiment of a method 150 by which a financial instrument based on content may be traded. After the financial instrument is created and issued at step 100 (see FIG. 1A), the instrument is offered at step 125. The investor establishes a position at step 140. An interested investor establishes a position taking into consideration risk. Positions, such as a long position and short position, are established by the investor and include the trading events that occur to the financial instrument. Trading events include: buy, sell, buy to open, buy to close, sell to open, and sell to close. Trading events are generally used to distinguish between establishing versus closing a long or short position. On the delivery date, the instrument provides a payout at step 150, which can be a gain, loss, or neither with respect to the investor's initial buy. The payout may be correlated to the performance metric used to determine the state of the target content. The payout may be structured as either a linear function or a non-linear function of the performance metric. The issuer of the financial instrument may be responsible for the payout.

Figure 2:
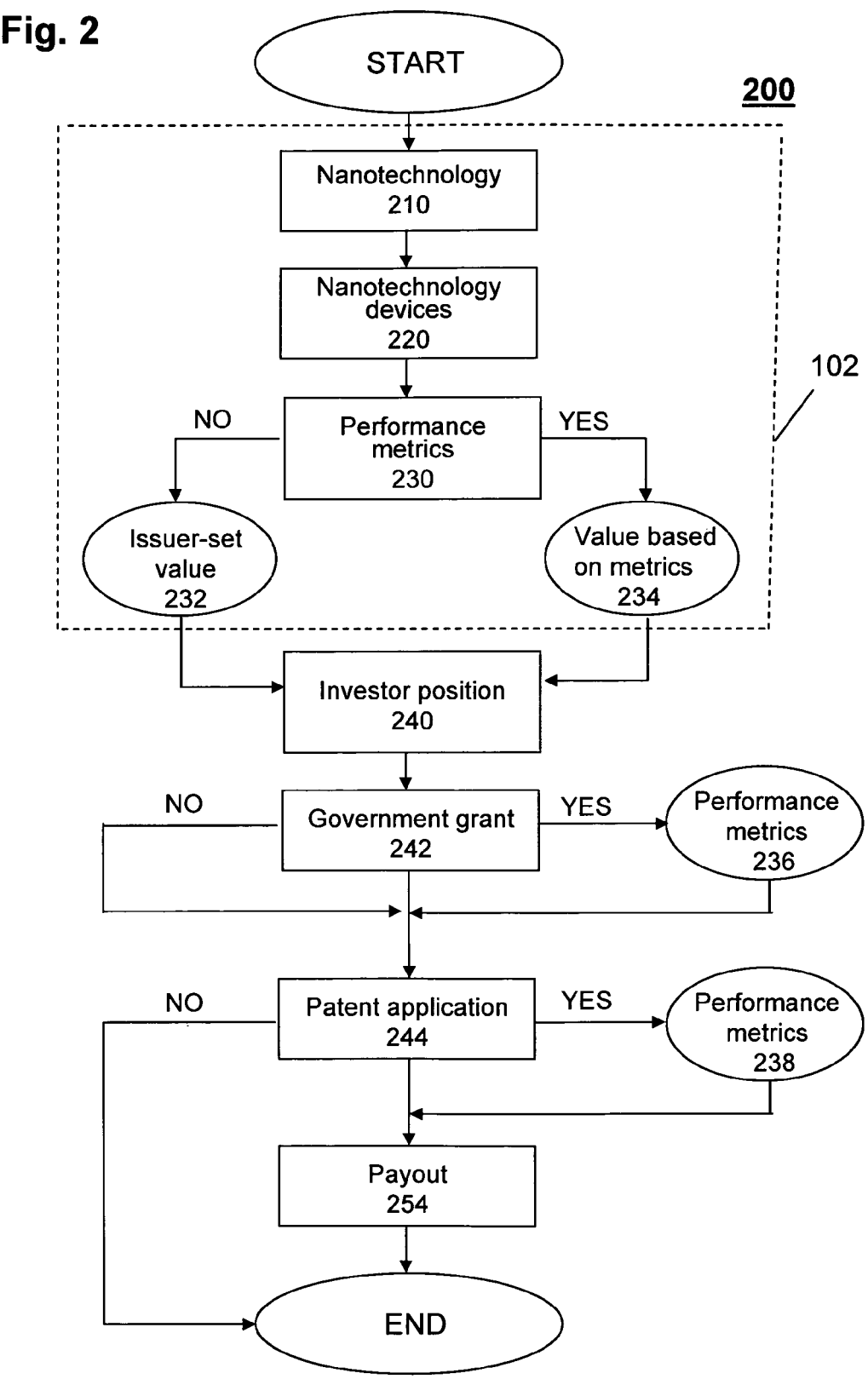
FIG. 2 is a flow chart of one embodiment of a financial instrument based on content according to the present invention.

FIG. 2 is a flow chart showing one embodiment for trading a financial instrument 200 based on potential content that has no current established value according to the present invention. A university, for example, may create a financial instrument shown at 102 to raise capital for research in nanotechnology devices by a renowned researcher with the hopes of developing a novel system, process, or device. The content is nanotechnology defined at step 210 and the target content is the potential of a novel system, process or device related to nanotechnology determined at step 220. Thus, the target content is unknown and highly speculative. If performance metrics are used at step 230, then the value of the financial instrument is based on those metrics at step 234.

In this example, the university does not use performance metrics at step 230 and, as a result, sets a value that the university believes is appropriate at step 232, based in part by the payout conditions. The university issues ten (10) instruments at $1000 each. The university establishes the payout conditions of 5% ($50 for one instrument bought) if the university receives a government grant and 10% ($100 for one instrument bought) if a patent application is filed in any country, either occurring within five years from the issue date of the financial instrument. Therefore, an investor will receive 20% ($200 for one instrument bought) if both a grant and patent application are achieved.

The investor establishes a position at step 240 with respect to the financial instrument. If a grant is offered and received by the university at step 242, performance metrics can be used to value the target content at step 236. For example, the metric may be the value of the grant with respect to the average of all other grants given by the government in the field of nanotechnology. Suppose the government grant was $5,000 and the average of all other grants given by the same entity was $2500. The performance metric substantiates a high value for the instrument.

If a patent application is filed at step 244, performance metrics can be used to re-value the target content at step 238. Established value is not achieved if a patent application is never filed in any country within the five years from the issue date of the financial instrument. The investor receives a payout at step 254 according to the payout conditions of the instrument.

Figure 3:
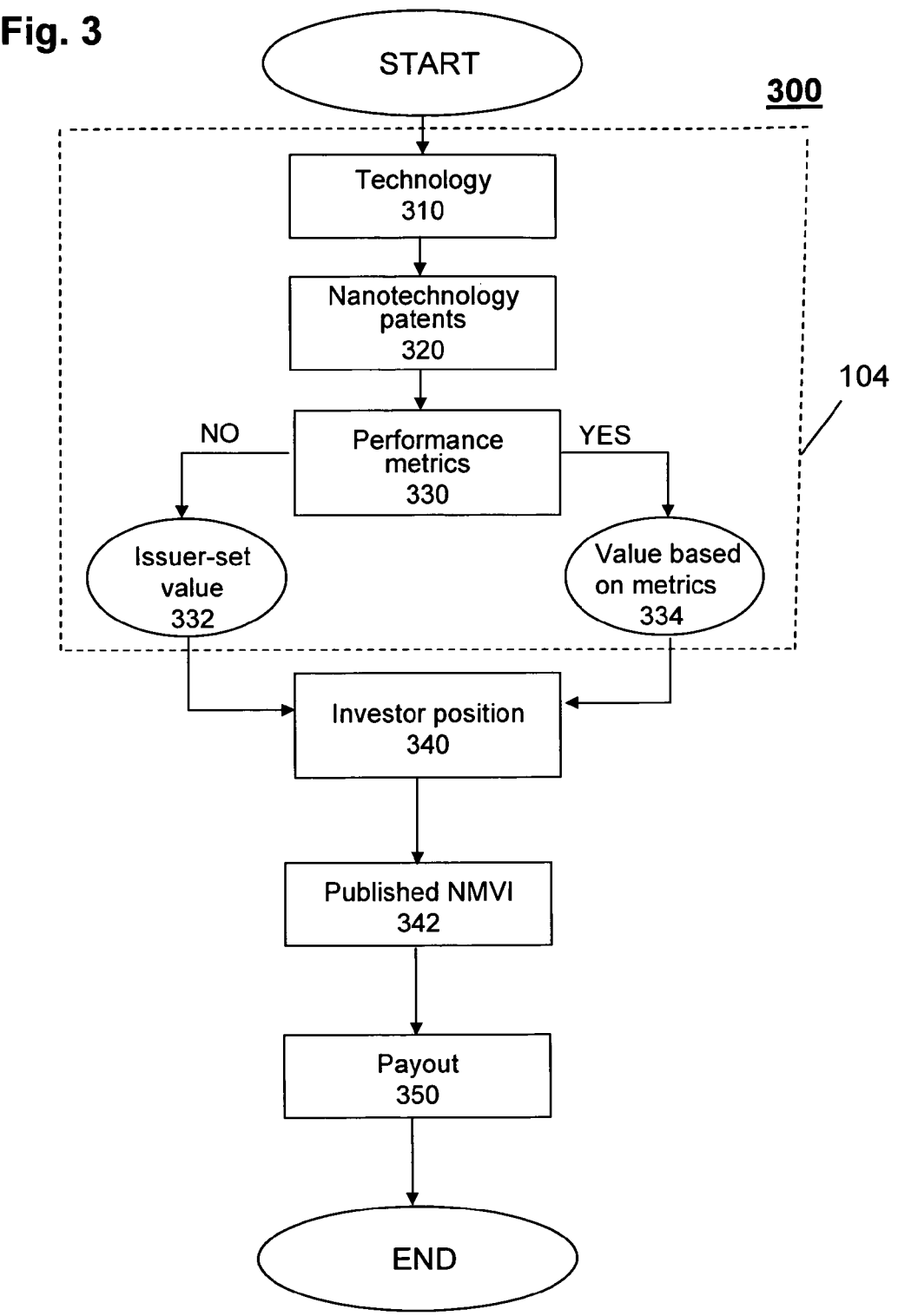
FIG. 3 is a flow chart of one embodiment of a financial instrument based on content according to the present invention.

FIG. 3 is a flow chart showing one embodiment for trading a financial instrument 300 based on actual content that has value established according to the present invention A third party issues a financial instrument as an investment opportunity for investors that wish to invest in all patents related to nanotechnology.

The third party creates the financial instrument 104 by defining the content as technology at step 310. With technology as the defined content, the target can be defined as patents in any one of the classes according the USPTO classification system that are within technology, such as: superconductor technology (class 505), combinational chemistry technology (class 506), nuclear technology (class 976), or nanotechnology (class 977). For purposes of this embodiment, the target content is determined at step 320 all the patents in nanotechnology (class 977). Target content may also be defined based on a relevance score, relevance threshold, or common identifier. A performance metric is used at step 330 to place a value at step 334 on the financial instrument, here the Nanotechnology Market Value Index (NMVI) as reported by a recognized performance metric publisher.

The third party issues five thousand (5000) instruments at $500 each. The payout condition is $10 times the published NMVI on the delivery date defined by the financial instrument. An investor establishes a position at step 340 and buys two instruments totaling $1000 with a value of the instrument is 40. On the delivery date, the published NMVI is 60. Therefore, the investor collects $600 as a payout at step 350 for each instrument totaling $1200.

Figure 4:
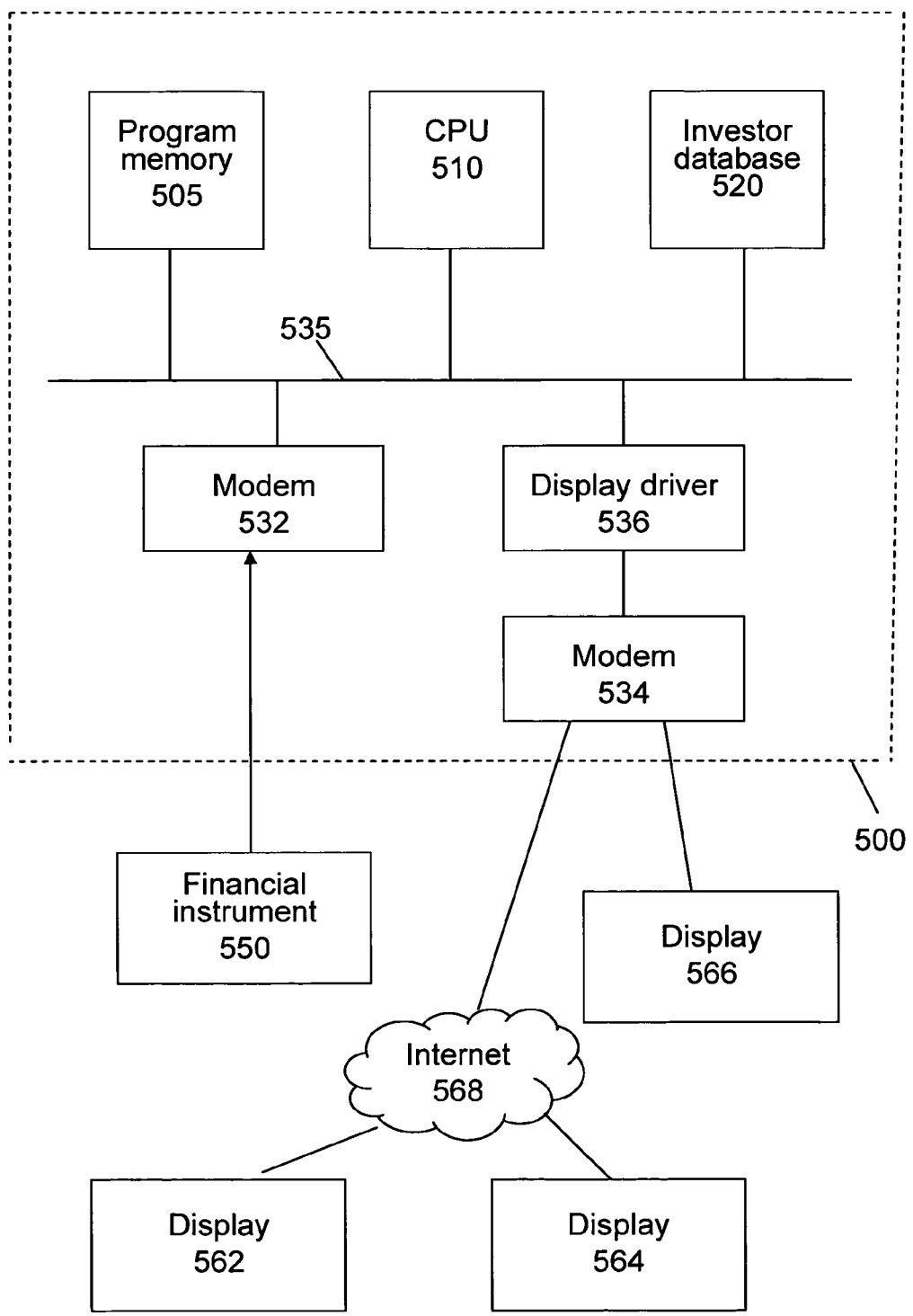
FIG. 4 is a schematic diagram illustrating one preferred embodiment of an exchange system for implementing the present invention.

FIG. 4 is a schematic diagram illustrating one preferred embodiment of an exchange system for implementing the present invention. The system preferably operates over either a private electronic communications network or over a public communications network such as the Internet, or both. Investors who preferably sign appropriate contracts that guarantee performance would be permitted to buy financial instruments based on content using the system, which is implemented on a general purpose or specially designed electronic computer.

System 500 includes program memory 505, central processing unit (CPU) 510, investor database 520, modems 532 and 534 and display driver 536. Preferably, all of these components are connected directly to an address/data bus 535 according to well known computer system implementations. System 500 also includes an input for financial instruments based on content 550 and connections to multiple display units 562, 564, 566, either directly (566) or via the Internet 568 (562, 564).

Program memory 505 preferably stores the various components of the computer software that operate the present invention. CPU 510 performs the various functions associated with trading as well as facilitates access to the various components of the system via address/data bus 535. The CPU also processes the positions including trading actions taken by the investor.

Investor database 520 preferably includes information about individual investors. Preferably, this database is secure whereby dissemination of any information therein is strictly controlled.

System 500 receives data regarding the financial instrument based on content 550 via modem 532, for example. The financial instrument data may come from the issuer directly or from an alternate source. Communication with the various investors is implemented via display driver 536, modem 534 and the various displays 562, 564, 566.

Specifically, as shown in FIG. 1, if system 500 of the present invention is operating under a private network scenario, display 566 is connected directly to modem 534. Alternatively, or in addition, communication with investors may occur over a public network such as the Internet 568 whereby display 562 and display 564 can be accessed.

The steps of creating a financial instrument based on content may be embodied in machine-executable instructions. The instructions can be used to cause a general-purpose or special-purpose processor which is programmed with the instructions to perform the steps of the present invention. Alternatively, the steps of the present invention may be performed by specific hardware components that contain hardwired logic for performing the steps, or by any combination of programmed computer components and custom hardware components.

The present invention may be provided as a computer program product which may include a machine-readable medium having stored thereon instructions which may be used to program a computer (or other electronic devices) to perform the creation of the financial instrument based on content according to the present invention. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic instructions. Moreover, the program to perform the creation of the financial instrument based on content may also be downloaded as a computer program product, wherein the program may be transferred from a remote computer (e.g., a server) to a requesting computer (e.g., a client) by way of a communication link (e.g., a modem or network connection).

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

What is claimed is:

1. A computerized method for creating and trading a content-based financial instrument comprising the steps of:
    selectively characterizing content-trading financial information executed by instructions stored in a computer readable storage medium comprising the steps of:
        defining content by a processor to which the content-based financial instrument is directed to establish defined content;
        selecting a target content by the processor from within the defined content, wherein the target content is a patent and said selecting step further includes the step of utilizing one or more target content determination approaches within a group consisting of:
        a classification system determination approach, wherein the target content is identified based on one of a class schedule, a subclass schedule, or a technology center identifier of a patent office,
        an analytical method determination approach, wherein the target content is identified based on emerging target content with the defined content,
        a relevance score determination approach, wherein the target content is identified based on relevance to a group of patents known to belong to the target content,
        a relevance threshold determination approach, wherein the target content is identified based on exceeding a threshold determined by the group of patents known to belong to the target content, and
        a common identifier determination approach, wherein the target content is identified based on a common characteristic,
    determining a value of the content-based financial instrument based on a valuation of the target content using one or more performance metrics selected from the group comprising of:
        closed-source analytics, wherein the target content valuation is estimated based at least in part on a private analysis not publicly available,
        open-source analytics, wherein the target content valuation is estimated based at least in part on one or more of the following: patent registration data in a patent office, all of the rights associated with a grant or a registration of the target content, a group of rights less than all of the rights arising from the grant or the registration of the target content, an exclusive license to practice one or more of the statutory or judicial-based rights of the target content, patent value, patent maintenance value, sales, and
        market-based analytics, wherein the target content valuation is estimated based at least in part on one or more of the following: trading data resultant from market activity for the underlying asset of a financial instrument that operates as a futures contract, shares of or licenses to individual patents that are publicly traded, groups of patents in the target content,
    publishing by the processor the content-trading financial information characterizing the content-based financial instrument on one or more display units of an electronic trading system, the content-trading financial information including the value of the content-based financial instrument; and
    accepting by the processor a position to the content-based financial instrument established by an investor.

2. The method for creating and trading a content-based financial instrument of claim 1 further comprising the step of evaluating the target content valuation of said determining step.

3. The method for creating and trading a content-based financial instrument of claim 2 further comprising the step of producing data from said evaluating step.

4. The method for creating and trading a content-based financial instrument of claim 1, wherein said determining step further includes the step of utilizing a payout condition.

5. The method for creating and trading a content-based financial instrument of claim 1, wherein the target content valuation is correlated to a payout issued on a delivery day.

6. The method for creating and trading a content-based financial instrument of claim 5 further comprising the step of issuing the payout on the delivery day.

7. The method for creating and trading a content-based financial instrument of claim 3, wherein said producing step further comprises the step of storing the data in a database.

8. The method for creating and trading a content-based financial instrument of claim 3, wherein said producing step further comprises the step of formulating trading strategies of a financial instrument.

9. The method for creating and trading a content-based financial instrument of claim 1, wherein the common characteristic of the common identifier determination approach is the same inventor of target content that is a plurality of patents.

10. The method for creating and trading a content-based financial instrument of claim 1, wherein the common characteristic of the common identifier determination approach is the same assignee of target content that is a plurality of patents.

11. The method for creating and trading a content-based financial instrument of claim 1, wherein the value of the content-based financial instrument is determined on a date the content-based financial instrument issues.

12. The method for creating and trading a content-based financial instrument of claim 1, wherein the value of the content-based financial instrument is determined on a date an investor establishes a position in the content-based financial instrument.

* * * * *